United States Patent
Rohmer

(10) Patent No.: US 7,271,338 B1
(45) Date of Patent: Sep. 18, 2007

(54) ELECTRICAL DEVICE WITH MULTI CURVED FACE

(75) Inventor: Richard Rohmer, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 72 days.

(21) Appl. No.: 10/834,695

(22) Filed: Apr. 29, 2004

(51) Int. Cl.
*H02G 3/14* (2006.01)
(52) U.S. Cl. .......................... 174/66; 174/67; 220/241
(58) Field of Classification Search .................. 174/66, 174/67; 220/241, 242; D8/353; D13/177; 200/339
See application file for complete search history.

(56) References Cited

U.S. PATENT DOCUMENTS

| | | | | |
|---|---|---|---|---|
| 2,634,016 A | * | 4/1953 | Hagen | 220/241 |
| 5,073,681 A | * | 12/1991 | Hubben et al. | 174/66 |
| 5,739,486 A | * | 4/1998 | Buckingham | 200/5 A |
| 6,923,663 B2 | * | 8/2005 | Oddsen et al. | 439/107 |
| 7,030,318 B2 | * | 4/2006 | Tufano et al. | 174/66 |

\* cited by examiner

*Primary Examiner*—Dhiru R. Patel
(74) *Attorney, Agent, or Firm*—Daniel P. Malley; Bond, Schoeneck & King PLLC; William Greener

(57) ABSTRACT

An electrical control device, such as an exemplary electrical receptacle, has a front face that is a blended, aspheric surface. The vertical edges of the device have an arcuate profile from top to bottom, preferably elliptical, and the horizontal edges of the device have an arcuate profile from side to side that may be elliptical or circular. The vertical profile of the front face along a centerline of the device is substantially flat, thus an electrical plug seated in the receptacle will be limited to a rocking dimension within UL guidelines for safety. A faceplate component for use in assembly with the electrical control device has an arcuate shape in the vertical dimension that substantially matches the vertical edge profile of the electrical control device.

41 Claims, 3 Drawing Sheets

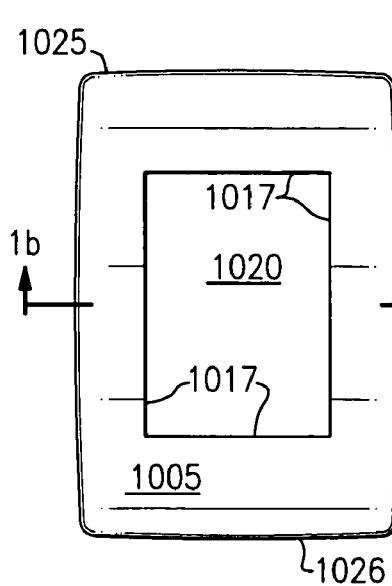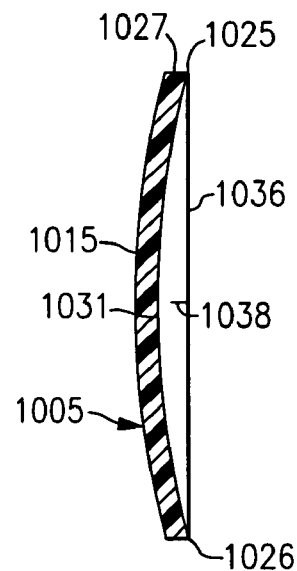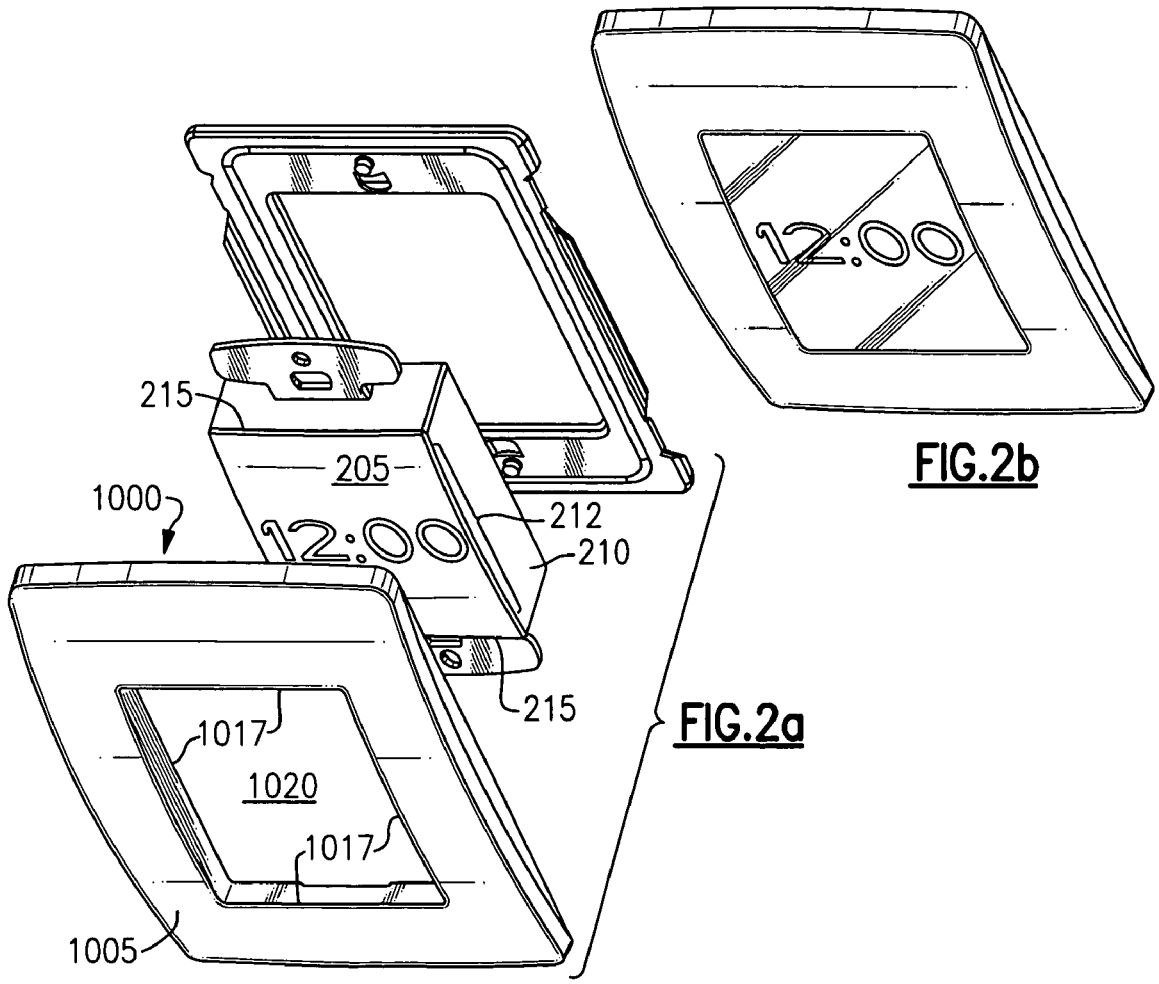
FIG.1a
FIG.1b
FIG.2a
FIG.2b

ELECTRICAL DEVICE WITH MULTI CURVED FACE

BACKGROUND OF THE INVENTION

1. Field of the Invention

Embodiments of the invention are directed to an electrical control device, an electrical control device faceplate, an electrical control device assembly and, more particularly, to these structures having curved faces.

2. Description of Related Art

An electrical control device as that term is used herein is a device intended to be mounted in a wall box and used to control, direct, or utilize the flow of electrical current. Non-limiting examples of electrical control devices that may fall under embodiments of the current invention include standard electrical receptacles capable of receiving an electrical plug connected to an electrical appliance, electrical switches for controlling lights or other receptacles in an electrical network, information devices such as clocks and thermostats, datacom ports and others that find use in commercial and residential buildings. These electrical control devices and others like them are typically part of an assembly that includes a faceplate. The faceplate functions to provide cosmetic integration of the electrical control device with the surroundings, such as a wall cut out that has been made to accommodate an electrical box, which houses the electrical control device and supply wires leading in and out.

Electrical control devices and assemblies as described herein are part of the visual architecture of the interior of a structure, thus there may be a desire to incorporate cosmetic design features in the visible portions of the electrical control devices and device assemblies. For example, U.S. patent Ser. No. 10/723,202 filed on Nov. 26, 2003 and commonly assigned, entitled Screwless Faceplate Components and Assembly, which application is hereby incorporated by reference in its entirety to the fullest extent allowed by applicable laws and rules, discloses an illustrative faceplate 1010 for an electrical control assembly as shown in FIG. 1. Significant features of the illustrative faceplate include invisible connection means between the faceplate and other assembly components (sub plate, wall box, control device) and an arcuate, illustratively, elliptical profile 1015 along a vertical cross section as shown in FIG. 1B.

For reasons of design continuity, the front face surface 205 of an electrical control device, such as the clock module 210 illustrated in FIG. 2A, for example, was designed to be flush with the faceplate in assembled condition as shown in FIG. 2B. To that end, the vertical profile 212 of the surface 205 of the clock module is arcuate and in this illustrative embodiment substantially identical to the elliptical profile 1015 of the faceplate. The top and bottom edges 215 of the clock module have a straight cross-sectional profile to match that of the faceplate straight horizontal profile 1017. Thus the surface shape of the illustrative clock component is generally cylindrical in the vertical direction and straight in the horizontal direction.

The inventor, however, recognized that the cylindrical shape described above for the illustrative control device was problematic when the control device was, for example, an electrical receptacle. Two illustrative disadvantages of a cylindrical shape for the face portion of the electrical receptacle are: 1) failure to meet the Underwriter Laboratories' (UL) requirement that a non-flat receptacle area may allow an inserted plug to rock up and down giving the end user the feel that the plug did not seat properly, and 2) a non-flat face portion might allow parts of the plug blades to be accessible, which could be a safety concern. However, it was also recognized that if the face portion of the receptacle was kept flat in the horizontal direction, significant discontinuities between the surfaces of the receptacle and the faceplate would be cosmetically distracting and potentially in violation of UL Code requirements.

Accordingly, the inventor recognized a need for an electrical control device that was both architecturally stylish and meets the safety requirements promulgated by UL.

SUMMARY OF THE INVENTION

Embodiments of the invention are directed to electrical control devices having blended, asymmetric surface shapes, electrical control device faceplates having arcuate profiles, and electrical control device assemblies including the electrical control devices and faceplates.

One embodiment of the invention is directed to an electrical control device including a device housing portion having a front face, the front face having a vertical edge and a horizontal edge, wherein the vertical edge intersects the horizontal edge at a common end point of the edges to form a corner of the front face, the front face having four corners. The vertical edge extending between a top end point and a bottom end point of the edge has a first arcuate cross sectional profile. The first arcuate cross sectional profile is most curved along the edges of the front face and becomes progressively flatter towards a vertical center line of the front face where the profile is substantially flat. In an aspect, the flat, vertical center line cross sectional profile has a relative height of between about 0.024 inches to 0.026 inches with respect to a plane that is tangent to the first arcuate cross sectional profile at the highest apex point. In another aspect, the relative height is nominally about 0.025 inches. The horizontal edge extending between a left end point and a right end point of the edge has a second arcuate cross sectional profile. The second arcuate cross sectional profile may vary in shape between the bottom horizontal edge of the front face and the top horizontal edge of the front face. In various aspects, the first arcuate cross sectional profile may be elliptical or circular; the second arcuate cross sectional profile may be elliptical or circular. In an aspect, the first arcuate cross sectional profile and the second arcuate cross sectional profile may be substantially the same shape. The front face of the electrical control device thus generally has a blended aspheric surface shape. Front face surface shapes having desired arcuate vertical and horizontal edge profiles can easily be generated by commercially available computer assisted design/computer assisted manufacturing (CAD/CAM) software running on a PC, for example. A particular program may request certain input parameters such as, for example, height and width dimensions, end point coordinates, profile sag values, offsets, tolerance values, and others depending upon the program algorithms.

The electrical control device also includes a device mechanism in cooperative engagement with the device housing and the front face of the housing. In an aspect, the device mechanism includes a standard UL 120V two- or three-prong receptacle, and the front face incorporates a pair of elongate, standard-spaced receptacle slots for receiving the plug-alms of all electrical plug. A maximum height difference, $\Delta h$, between a midpoint of the pair of the receptacle slots and an outermost elongate edge of one of the receptacle slots is $0 < \Delta h \leq 0.0075$ in. In various aspects, the device mechanism may include a transient voltage surge suppressor; a ground fault circuit interrupter; an arc fault circuit interrupter; an electrical switch; a clock; a thermostat; a rheostat (dimmer); a datacom port; or other electrical control mechanisms known to those skilled in the art.

Another embodiment of the invention is directed to an arcuate faceplate component for surrounding and cooperatively engaging an electrical control device. The faceplate has a front face including four inner edges defining an aperture for the electrical control device, and also has a top horizontal edge, a bottom horizontal edge and an arcuate, vertical cross sectional profile extending between the top horizontal edge and the bottom horizontal edge. In an aspect, the arcuate, vertical cross sectional profile has a shape that substantially matches the shape of the first arcuate cross sectional profile of the electrical control device according to the embodiment described above. In various aspects, the arcuate, vertical cross sectional profile of the faceplate may be elliptical or circular. The elliptical shape can be expressed as $(x^2/a^2)+(y^2/b^2)=1$, where x and y are points on the ellipse, a defines a half-major axis of the ellipse, b defines a half-minor axis of the ellipse, and, in an exemplary aspect, a=2.750 in±0.125 in and b=0.575 in ±0.125 in. According to a further aspect, the front face of the faceplate has a vertical cross sectional shape that is substantially identical to the shape of the vertical cross sectional profile extending between the top horizontal edge and the bottom horizontal edge, with the front face vertical cross sectional profile being parallely displaced from the vertical cross sectional profile, thereby forming a ledge along the top and the bottom horizontal edges of the faceplate. In general terms, the arcuate, vertical cross sectional profile is a smooth and continuous curve that intersects a point on the top horizontal edge, a corresponding point on the bottom horizontal edge and a midpoint that defines a sag of the profile, where the sag is the perpendicular distance between the midpoint of the cross sectional profile and a line intersecting the point and the corresponding point.

According to another embodiment, an electrical control device assembly includes an electrical control device and a faceplate component, according to the embodiments described above, cooperatively engaged to form the assembly.

BRIEF DESCRIPTION OF THE DRAWINGS

FIG. 1*a* is a front elevational view of a faceplate component according to an embodiment of the invention;

FIG. 1*b* is a right side elevational view of the faceplate component illustrated in FIG. 1*a*;

FIG. 2*a* is an exploded perspective view of an illustrative electrical control device assembly used to illustrate background concepts of the invention;

FIG. 2*b* is a perspective assembled view of the assembly shown in FIG. 2*a*;

DETAILED DESCRIPTION OF A PREFERRED EMBODIMENT OF THE INVENTION

Embodiments of the invention are directed to an electrical control device, an electrical control device faceplate, and an electrical control device assembly, wherein the front face of the electrical control device and faceplate have various arcuate profiles and surface shapes.

As referred to above, there is a safety concern with electrical receptacles; i.e., when an electrical plug is inserted into the receptacle, the plug should seat flush to the receptacle face. It is highly desirable that no section of the plug blades be accessible when the plug is fully inserted into the receptacle. The shape aspects of the electrical control device embodiments described herein functionally address these safety concerns. At the same time, the shape aspects allow the electrical control device to cooperatively engage architectural variations of faceplate components according to embodiments described herein, thus providing for electrical control device assemblies that meet functional requirements and address architectural considerations.

Figure 3:
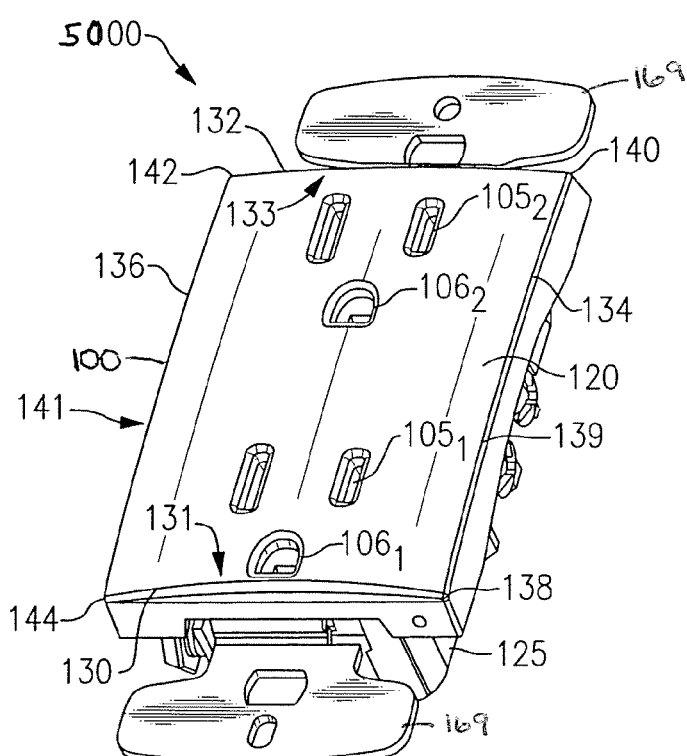
FIG. 3 is a perspective view of an electrical control device according to an exemplary embodiment of the invention.

FIG. 3 shows a perspective view of an illustrative electrical control device 5000 according to an embodiment of the invention. The illustrative electrical control device 5000 is in the form of a standard, duplex three-prong receptacle device mechanism 100. The device mechanism 100 includes a device housing portion 125. The receptacle 100 includes first and second pairs of elongate spaced receptacle slots $105_1$, $105_2$, and associated ground slots $106_1$, $106_2$, for receiving the plug arms of an electrical plug (not shown). The electrical control device housing portion 125 has a front face 120. Attachment structures 169 in the form of ears, as they are commonly referred to, are operatively connected to the device housing to facilitate mounting of the electrical control device in an electrical box or like structure. It is intended to be clearly understood that the electrical control device 5000 is not limited to a receptacle, but rather may include a fault interrupter circuit; a switch; a dimmer; a clock; a thermostat; a datacom receptacle; and others that a person skilled in the art will appreciate. The electrical control device embodiments of the invention, however, will be described in terms of the duplex receptacle aspect because this facilitates a clear and concise description, and because the receptacle aspect addresses unique requirements for receptacles that are mindful of UL requirements and/or recommendations.

The front face 120 of the control device 5000 has a bottom horizontal edge 130, a top horizontal edge 132, a right side vertical edge 134, and a left side vertical edge 136. The vertical and horizontal edges intersects at common end points of the edges to form the four corners 138, 140, 142 and 144 of the front face, as shown. The right vertical edge 134 extending between the top right end point 140 and the bottom right end point 138 has a first arcuate cross sectional profile 139. The left vertical edge 136 extending between the top left end point 142 and the bottom left end point 144 also has a first arcuate cross sectional profile 141 identical to profile 139. The bottom horizontal edge 130 extending between the bottom left end point 144 and the bottom right end point 138 has a second arcuate cross sectional profile 131. The top horizontal edge 132 extending between the top left end point 142 and the top right end point 140 also has a second arcuate cross sectional profile 133 that may or may not be the same shape as the second arcuate cross sectional profile 131 due to the vertical asymmetry of the receptacle slot pairs on the front face. In an exemplary aspect described in greater detail below, the first arcuate cross sectional profile 139 (141) is elliptical.

Figure 4A:
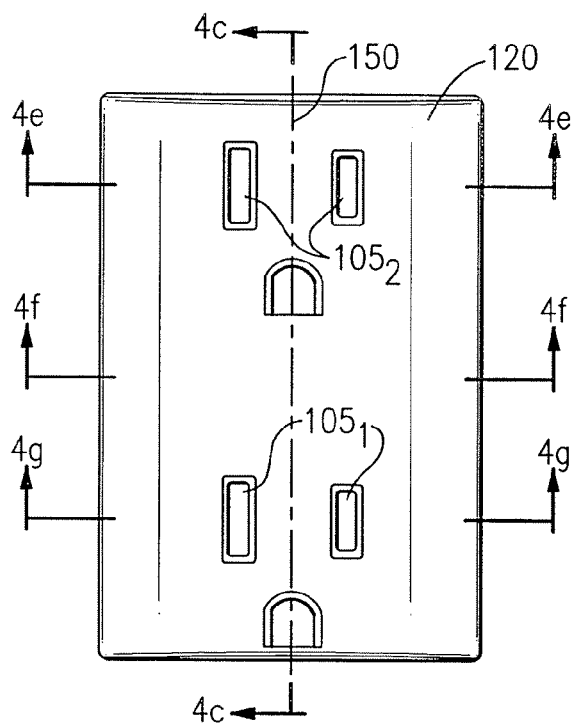
FIG. 4*a* is a front elevational line view of the front face of the electrical control device shown in FIG. 3.
Figure 4B:
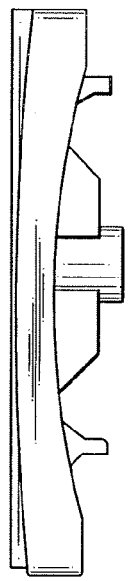
FIG. 4*b* is a right side elevational view of a front housing portion of the electrical control device of FIG. 4*a*.
Figure 4C:
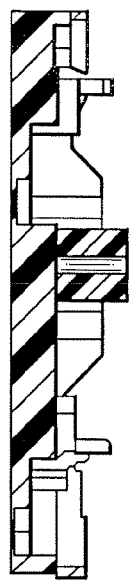
FIG. 4*c* cross sectional view of FIG. 4*a* along line O-D.
Figure 4D:
FIG. 4*d* is a bottom plan view of FIG. 4*a*.

As shown in FIG. 4a, the front face 120 has a vertical centerline 150 illustrated by the dashed line representing section O-D. The vertical centerline 150 splits the difference between the standard spaced receptacle slots 105. The vertical profile of the front face along line 150 is substantially flat as shown in FIG. 4c. Thus the first arcuate cross sectional profile 139 (141) has a maximum curvature at the right and left edges of the front face and blends into the flat profile 150 in a center region of the front face. The second arcuate cross points. Such shapes can be generated with the use of software programs designed for this purpose, for example, Pro-Engineer V.2001 CAD/CAM program from PTC Company, Nashua, N.H.

According to the exemplary embodiment, the desired sag value 182 is in a range of between 0.048 inches and 0.128 inches, and is nominally about 0.068 inches. These values are appropriate for a residential type duplex electrical receptacle where the vertical distance between end points 1 and 3 is nominally 2.6 inches. In an aspect of the embodiment, this distance may have a tolerance of ±0.80 inches. Using these dimensions as input parameters in an appropriate CAD/CAM program such as referred to above, a smooth curve representing the first arcuate cross sectional profile 139 can be generated. Depending on the tolerance values, the profile shape will typically be elliptical, but may be circular. According to the exemplary embodiment, the profile shape is elliptical.

Figure 5A:
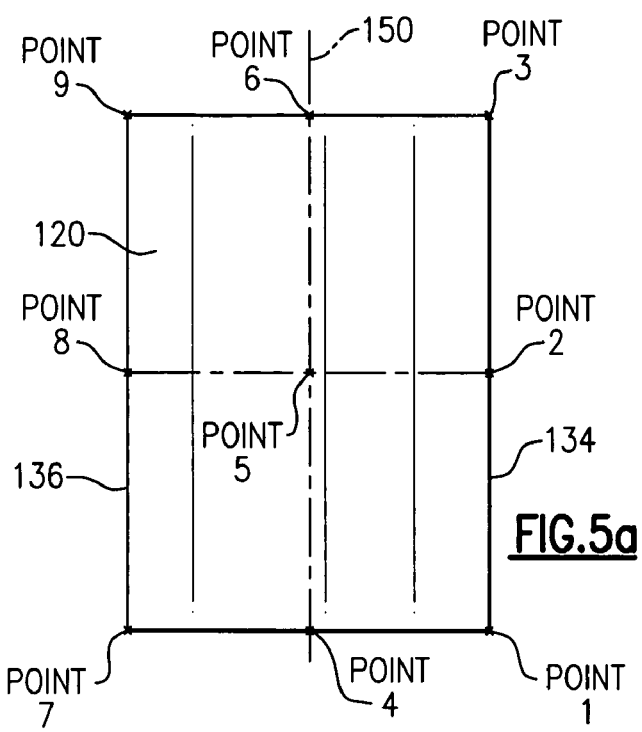
FIGS. 5(*a-c*) are respective front, side and bottom line views illustrating design parameters of an electrical control device according to an embodiment of the invention.
Figure 5B:
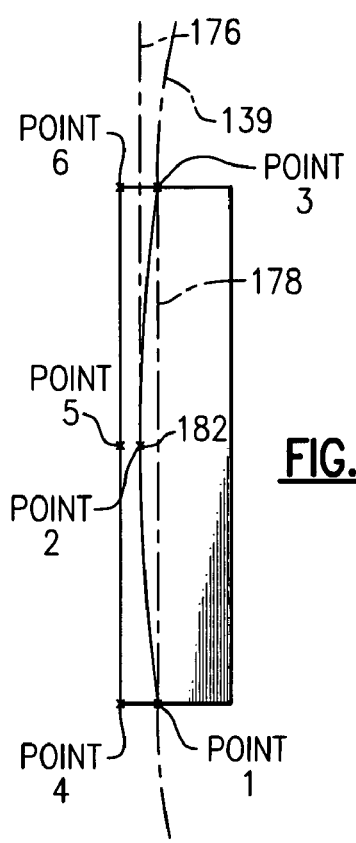
Figure 5C:
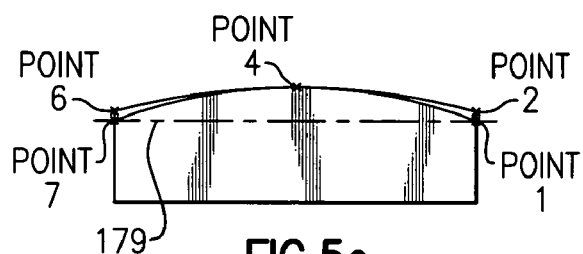

For the same residential type duplex electrical receptacle, the horizontal distance between points 1 and 7 (and between points 3 and 9), as shown in FIG. 5, is nominally 1.787±0.25 inches. Knowing that the centerline 150 is flat and nominally 0.024 to 0.026 inches above the tangent line 176 of the vertical edge profile will define the sag and shape of the second arcuate profiles 131, 133.

Figure 4E:
FIGS. 4(*e-g*) are cross sectional views of FIG. 4*a* along lines A-A, B-B and C-C, respectively.
Figure 4F:
Figure 4G:
Figure 6:
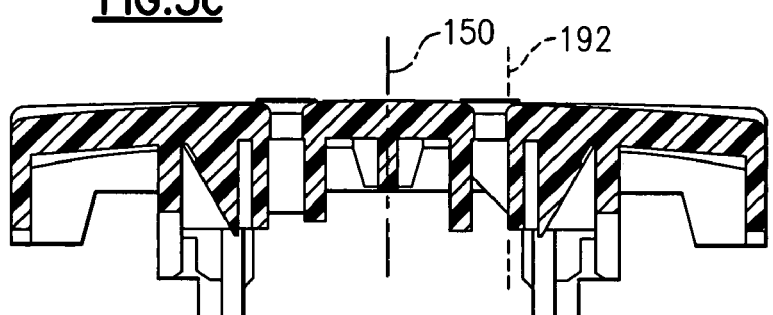
FIG. 6 is an enlarged view of FIG. 4*c*.

Referring to FIG. 4C, which is a cross sectional view of the device housing through vertical centerline section O-D of FIG. 4a, the surface is flat and straight. Horizontal cross sectional profiles of the front face along the bottom horizontal edge 130 and through sections A-A, B-B and C-C are shown in FIGS. 4(d-g). Due to the location of the receptacle slots 105 on the faceplate, the horizontal cross sectional profiles of the faceplate vary between the top and bottom horizontal edges. For example, the profile through section A-A (top receptacle slots) as shown in FIG. 4e exhibits a relative height differential of approximately 0.053 inches between the center of the profile (line 150) and the right edge of the profile 139. The profile through section B-B (bottom receptacle slots) as shown in FIG. 4f has a corresponding relative height differential of approximately 0.039 inches. A relative height differential of 0.024 inches occurs through a horizontal cross section of the faceplate at the center of the device as shown in FIG. 4g. Due to the relative placement of the receptacle slots $105_2$, the horizontal cross sectional profile through section A-A shows the greatest amount of relative height differential. However, as illustrated in FIG. 6, the relative height differential from the centerline 150 to an outside edge 192 of one of the elongate receptacle slots is only approximately 0.007 inches. This difference would allow a plug seated in the receptacle to rock back and forth by a total of only 0.014 inches, which meets UL requirements.

According to another embodiment illustrated with respect to FIGS. 1a and 1b, a faceplate component 1000 for surrounding and cooperatively engaging an electrical control device 100, has a front face 1005 having four inner edges 1017 that define an aperture 1020 for the electrical control device. The faceplate 1000 has a top horizontal edge 1025, a bottom horizontal edge 1026, and an arcuate, vertical cross sectional profile 1015 extending between the top horizontal edge and the bottom horizontal edge. According to an exemplary aspect, the arcuate, vertical cross sectional profile 1015 has a shape that substantially matches the shape of the first arcuate cross sectional profile 139 (141) of the electrical control device described above. Thus, in an exemplary aspect, the profile 1015 is elliptical, but may be circular depending on parameter tolerances. As shown in FIG. 1b, the front face 1005 is displaced parallel to the profile surface 1015 by a distance X, forming a ledge 1027 along the top and bottom edges of the faceplate. The shape of the profile 1005 is thus the same as that of profile 1015. In the exemplary embodiment, the distance X is between about 0.180 to 0.200 inches, and is nominally 0.190 inches.

According to an exemplary aspect, the actual profile 1015 is obtained by considering that the vertical distance between the top horizontal edge 1025 and the bottom horizontal edge 1026 of a typical faceplate is between about 4.5 inches to 5.25 inches. If point 1031 in FIG. 1b is at the vertical midpoint of the faceplate, then the sag 1038 will be the perpendicular distance between the midpoint 1031 and the straight line 1036 intersecting corresponding points on the top and bottom horizontal edges. If the length of straight line is nominally 4.81 inches and the sag value is chosen to be about 0.310 inches, a functionally acceptable and cosmetically appealing profile can be obtained by a smooth curve that intersects the edge points and the midpoint. When X has a nominal value of 0.190 inches, the front face 1005 of the faceplate has a sag value from a wall surface of very close to 0.5 inches.

The top and bottom horizontal edges of the faceplate are flat. Since the top and bottom horizontal edges of the electrical control device embodiments are arcuate and the centerline of the front face is displaced by a nominal 0.025 inches from the edge profile tangent, the seating of an electrical plug in the device will not be hindered by the faceplate front face as it will be flush with the vertical edge profile of the device upon assembly.

Figure 7:
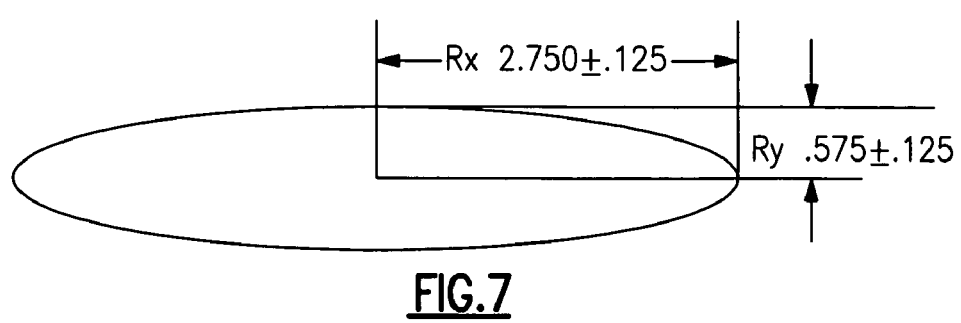
FIG. 7 is a drawing of an ellipse showing major and minor half-axis dimensions according to an exemplary embodiment of the invention.

According to another exemplary aspect, the profile of the front face is elliptical and is expressed as $(x^2/a^2)+(y^2/b^2)=1$, where x and y are points on the ellipse, a defines the half-major axis of the ellipse, b defines a half-minor axis of the ellipse, and a=2.750 in±0.125 in and b=0.575 in±0.125 in, as shown in FIG. 7.

The dimensions provided in the exemplary embodiments are representative of functional parameter ranges that meet safety requirements set forth by UL. All of the embodiments described herein relate to single gang electrical devices and single gang faceplates comprising single gang assemblies, however, a person skilled in the art will recognize that the parameters can be scaled appropriately to apply to multi-gang devices and assemblies.

The foregoing embodiments and aspects of the invention are disclosed herein by way of examples only and are not intended to limit the scope of the present invention, which is solely defined by the appended claims. A person of ordinary skill in the art will appreciate many variations and modifications within the scope of this invention.

I claim:

1. An electrical control device, comprising:
a device housing portion having a front face, said front face having a vertical edge and a horizontal edge, wherein the vertical edge intersects the horizontal edge at a common end point of the edges to form a corner of the front face, said front face having four corners; said device housing portion including a device mechanism in cooperative engagement with the device housing portion and the front face of the housing portion, wherein the vertical edge extending between a top end point and a bottom end point of the edge has a first arcuate cross sectional profile and further wherein the horizontal edge extending between a left end point and a right end point of the edge has a second arcuate cross sectional profile, and a device mounting structure in cooperative engagement with the device housing portion.

2. The electrical control device of claim 1, wherein the first arcuate cross sectional profile is elliptical.

3. The electrical control device of claim 2, wherein the second arcuate cross sectional profile is elliptical.

4. The electrical control device of claim 2, wherein the second arcuate cross sectional profile is circular.

5. The electrical control device of claim 1, wherein the first arcuate cross sectional profile is circular.

6. The electrical control device of claim 1, wherein the second arcuate cross sectional profile is elliptical.

7. The electrical control device of claim 1, wherein the second arcuate cross sectional profile is circular.

8. The electrical control device of claim 1, further wherein the front face has a vertical centerline-cross-sectional profile that is substantially flat between a top horizontal edge and a bottom horizontal edge of the front face.

9. The electrical control device of claim 8, wherein the front face along the vertical centerline has a relative height of between about 0.024 inches to 0.026 inches with respect to a parallel tangent plane of a vertical edge.

10. The electrical control device of claim 9, wherein the relative height is nominally 0.025 inches.

11. The electrical control device of claim 1, further wherein the first arcuate cross sectional profile and the second arcuate cross sectional profile are substantially identical in shape.

12. The electrical control device of claim 1, further wherein the second arcuate cross sectional profile of a bottom edge of the front face is different than the second arcuate cross sectional profile of a top edge of the front face.

13. The electrical control device of claim 1, wherein the front face is a smoothly blended aspherical surface.

14. The electrical control device of claim 1, wherein the first arcuate cross sectional profile extending between the top end point and the bottom end point of the vertical edge has a midpoint, said first arcuate cross sectional profile being a smooth and continuous curve that intersects the top end point, the bottom end point and the midpoint.

15. The electrical control device of claim 14, wherein the first arcuate cross sectional profile has a sag defined as a perpendicular distance between the mid point and a straight line connecting the top end point and the bottom end point, further wherein the sag has a value between about 0.048 inches to 0.128 inches and the top end point and the bottom end point have a separation distance of 2.6 inches±0.80 inches.

16. The electrical control device of claim 15, wherein the sag has a nominal value of approximately 0.068 inches.

17. The electrical control device of claim 15, wherein the separation distance has a nominal value of approximately 2.6 inches.

18. The electrical control device of claim 15, wherein the second arcuate cross sectional profile extending between the left end point and the right end point of the horizontal edge has a midpoint, said second arcuate cross sectional profile being a smooth and continuous curve that intersects the left end point, the right end point and the horizontal edge midpoint.

19. The electrical control device of claim 18, wherein the left end point and the right end point have a separation distance of 1.787 inches±0.25 inches.

20. The electrical control device of claim 1, wherein the device mechanism includes a standard UL 120 Volt receptacle, and the front face incorporates a pair of elongate, standard-spaced receptacle slots for receiving the plug-arms of an electrical plug, further wherein a maximum height difference, $\Delta h$, between a midpoint of the pair of the receptacle slots and an outermost elongate edge of one of the receptacle slots is $0 < \Delta h \leqq 0.0075$ inches.

21. The electrical control device of claim 20, wherein the device mechanism includes a transient voltage surge suppressor.

22. The electrical control device of claim 20, wherein the device mechanism includes one of a ground fault circuit interrupter and an arc fault circuit interrupter.

23. The electrical control device of claim 1, wherein the device mechanism includes an electrical switch.

24. The electrical control device of claim 1, wherein the device mechanism includes a clock.

25. The electrical control device of claim 1, wherein the device mechanism includes a thermostat.

26. The electrical control device of claim 1, wherein the device mechanism includes a rheostat.

27. The electrical control device of claim 1, wherein the device mechanism includes a datacom port.

28. A faceplate component for surrounding and cooperatively engaging an electrical control device, the faceplate component having a front face including four inner edges defining an aperture for the electrical control device, said faceplate having a top horizontal edge, a bottom horizontal edge, and two side edges connecting the top edge and the bottom edge defining an outer perimeter of the faceplate, and an arcuate, vertical cross sectional profile extending between the top horizontal edge and the bottom horizontal edge wherein the top and bottom horizontal edges of the faceplate are flat.

29. The faceplate component of claim 28, wherein the electrical control device includes a device housing having a front face, said front face having a vertical edge and a horizontal edge, wherein the vertical edge intersects the horizontal edge at a common end point of the edges to form a corner of the front face, said front face having four corners, and a device mechanism in cooperative engagement with the device housing and the front face of the housing, wherein the vertical edge extending between a top end point and a bottom end point of the edge has a first arcuate cross sectional profile, further wherein the arcuate, vertical cross sectional profile of the front face of the faceplate component has a shape that substantially matches the shape of the first arcuate cross sectional profile of the electrical control device housing.

30. The faceplate component electrical control device of claim 28, wherein the arcuate, vertical cross sectional profile of the front face of the faceplate component is elliptical.

31. The faceplate component of claim 30, wherein the elliptical shape is expressed as $(x^2/a^2)+(y^2/b^2)=1$, where x and y are points on the ellipse, a defines a half-major axis of the ellipse, y defines a half-minor axis of the ellipse, and where a=2.750 inches±0.125 inches and b=0.575 inches±0.125 inches.

32. The faceplate component of claim 28, wherein the arcuate, vertical cross sectional profile of the front face of the faceplate component is circular.

33. The faceplate component of claim 28, wherein the front face of the faceplate has a vertical cross sectional shape that is substantially identical to the shape of the vertical cross sectional profile extending between the top horizontal edge and the bottom horizontal edge, said front face vertical cross sectional profile being parallely displaced from the vertical cross sectional profile extending between the top horizontal edge and the bottom horizontal edge by a desired amount, thereby forming a ledge along the top and the bottom horizontal edges of the faceplate.

34. The faceplate component of claim 33, wherein the displacement at a midpoint of the vertical cross sectional profile extending between the top horizontal edge and the bottom horizontal edge is between about 0.180 inches to 0.200 inches.

35. The faceplate component of claim 34, wherein the displacement is nominally about 0.190 inches.

36. The faceplate component of claim 28, wherein the arcuate, vertical cross sectional profile is a smooth and continuous curve that intersects a point on the top horizontal edge, a corresponding point on the bottom horizontal edge and a midpoint that defines a sag of the profile, said sag being a perpendicular distance between the midpoint of the cross sectional profile and a line intersecting the point and the corresponding point.

37. The faceplate component of claim 36, wherein the distance between the point on the top horizontal edge and the corresponding point on the bottom horizontal edge is between about 4.5 inches and 5.25 inches, and the sag is between about 0.300 inches to 0.320 inches.

38. The faceplate component of claim 37, wherein the distance between the point on the top horizontal edge and the corresponding point on the bottom horizontal edge is nominally about 4.81 inches and the sag is nominally about 0.310 inches.

39. The faceplate component of claim 28, wherein the front face of the faceplate has a flat horizontal cross sectional profile.

40. An electrical control device assembly, comprising:
   an electrical control device including a device housing having a smooth, aspherical front face; and
   a faceplate component having a top and bottom horizontal cross sectional profile, which are flat and an arcuate vertical profile, and an aperture within which the electrical control device is cooperatively engaged in assembly, wherein the arcuate vertical profile of the front face of the faceplate matches an arcuate profile of a vertical edge of the electrical control device housing.

41. The electrical control device assembly of claim 40, wherein the front face of the faceplate component is substantially flush with the arcuate profile of a vertical edge of the electrical control device housing in assembly.

* * * * *